United States Patent [19]

Seregely et al.

[11] 3,949,132

[45] Apr. 6, 1976

[54] MARKING BOARDS AND ERASABLE INK COMPOSITIONS THEREFOR

[75] Inventors: Daniel W. Seregely, Los Angeles; Bernard G. Kidda, Marina del Rey, both of Calif.

[73] Assignee: The Gillette Company, Santa Monica, Calif.

[22] Filed: Feb. 25, 1974

[21] Appl. No.: 445,597

Related U.S. Application Data

[62] Division of Ser. No. 256,818, May 25, 1972, Pat. No. 3,834,823.

[52] U.S. Cl. .......................... 428/207; 35/61; 35/66
[51] Int. Cl.² ............................................. B32B 3/00
[58] Field of Search ........ 117/38, 138.8 B, 138.8 E, 117/138.8 F, 138.8 PV, 138.8 UA, 161 K, 161 UE, 161 UB, 161 ZA; 106/20–23, 32.5; 401/198; 8/4; 35/61, 66; 427/256; 428/195, 206, 207, 446, 447, 448, 451, 484

[56] References Cited
UNITED STATES PATENTS

| | | | |
|---|---|---|---|
| 2,623,827 | 12/1952 | Moos | 106/23 |
| 2,771,372 | 11/1956 | Chambers et al. | 106/22 |
| 3,477,862 | 11/1969 | Forsyth | 106/22 |
| 3,549,463 | 12/1970 | Frech | 161/2 |
| 3,563,782 | 2/1971 | Liberman et al. | 117/37 R |
| 3,627,546 | 12/1971 | Coppeta | 106/19 |
| 3,672,842 | 6/1972 | Florin | 106/22 X |
| 3,705,043 | 12/1972 | Zabiak | 106/22 X |
| 3,705,045 | 12/1972 | Nadolski | 106/22 X |

FOREIGN PATENTS OR APPLICATIONS

| | | | |
|---|---|---|---|
| 885,856 | 12/1961 | United Kingdom | 106/22 |

OTHER PUBLICATIONS

DuPont Magazine, "Colorful Combinations on White Blackboards", May–June, 1971, pp. 7–9.

*Primary Examiner*—Thomas J. Herbert, Jr.
*Assistant Examiner*—Bruce H. Hess
*Attorney, Agent, or Firm*—Poms, Smith, Lande & Glenny

[57] ABSTRACT

An ink composition for writing instruments having a porous writing point, which will write satisfactorily on relatively smooth, hard surfaces (e.g. solid plastic surfaces) and which can easily be erased from said smooth, hard surfaces by merely wiping with a dry cloth or paper tissue. The ink composition contains, as essential ingredients, water, a water soluble dye, a silicone surfactant, and a release agent in which the water soluble dye is insoluble. The ink composition may also contain a wax to prevent dusting. An erasing system including a marking board having a smooth, hard, non-porous surface of plastic and a porous point pen having an ink therein which will deposit uniform, legible traces, markings or lines on said plastic surface and which can be removed therefrom with a dry cloth or paper tissue.

3 Claims, No Drawings

MARKING BOARDS AND ERASABLE INK COMPOSITIONS THEREFOR

This is a division of application Ser. No. 256,818, filed May 25, 1972, now U.S. Pat. No. 3,834,823.

BACKGROUND OF THE INVENTION

Heretofore, the normal manner for easily removing indicia from a substrate was to utilize a blackboard and chalk. The chalk is easily removed from the blackboard by any dry eraser. This system has many disadvantages, not the least of which is the fact that blackboards are relatively heavy and chalk is a messy and inconvenient substance to work with. Also, when writing on the blackboard and erasing the chalk material from the blackboard a fine dust is formed (from the chalk particles) which gets onto the floor, the hands of the person writing or erasing, and the clothes of such person. Moreover, chalk material is very inconvenient to carry because of the dusting problem and therefore is not normally readily available in homes and offices.

In view of the many disadvantages of using a blackboard-chalk system, it is readily apparent that it would be highly advantageous if an erasing system could be developed utilizing a readily available writing implement, such as a porous point pen, having an ink which can write on a smooth, hard surface such as a plastic and which would be easily erasable therefrom utilizing a dry erasing material such as a cloth or tissue paper. However, writing instruments employing a porous tip (such as a tip made of fibers suitably bonded together to provide a multiplicity of channels) and an ink reservoir require an ink which is readily uniformly fed to the tip from the reservoir, will not adversely effect the tip, will not dry out on the tip when the tip is exposed to atmospheric conditions for an extended period of time, and which does not have an objectionable odor. Many marking pens in current use utilize an aqueous ink because, inter alia, such inks generally do not have the objectionable odor of marking pen inks made with an aromatic solvent. However, such aqueous inks will, in general, not write on smooth, hard surfaces such as plastic because the inks will retract into small individual droplets. Additionally, such inks are not satisfactory for an erasing system because they are not easily erased after drying and will not write satisfactorily on a plastic substrate having sebum (a fatty oil-like material secreted by the sebaceous glands of the skin). Sebum on the writing substrate of a marking board is inevitable inasmuch as the writing substrate is extensively touched by the fingers. Hence, most porous point pen inks in use today are not satisfactory for use in an erasing system in which a plastic substrate is used as the writing surface and a dry eraser is utilized as the means for wiping the ink off of the plastic surface.

SUMMARY OF THE INVENTION

The present invention is based upon the suprising discovery that inks suitable for use in porous point pens (e.g. pens having felt points and points composed of synthetic or natural fibers bonded together to provide capillary channels) can be made which will deposit uniform, legible traces during writing on smooth, virtually impervious, hard plastic surfaces, said traces or lines being easily erased from said plastic surface after the ink has dried without dusting and without an after image utilizing a dry eraser such as a cloth or paper tissue.

It is thus an object of the present invention to disclose and provide an ink which will write satisfactory on smooth plastic surfaces and which can easily be erased therefrom after drying utilizing a dry eraser.

It is another object of the present invention to provide a marking board system composed of a porous point pen, a marker board the surface of which is made of plastic, and an ink contained in the porous point pen which has all of the desirable characteristics necessary for an ink to be usable in a porous point pen but also possesses the attributes of being able to write satisfactorily on plastic surfaces and to be easily erased from such plastic surface.

A further object of the present invention is to disclose and provide a method for writing legible tracings on a smooth plastic surface, such tracings being easily removed from such plastic surface utilizing a dry eraser.

Still a further object of the present invention is to provide a porous point pen containing an ink which will deposit legible and coherent tracings on a smooth, hard, non-porous plastic surface and after tracings are dry, are easily removed therefrom with a dry eraser.

Another and further object of the present invention is to embody a marking board composed of a hard, smooth, impervious plastic surface upon which there are legible tracings consisting of a film of a release agent one surface of which is in contact with said plastic surface, the other surface of said film having a layer of water soluble dye particles.

The accomplishment of these and other objects of the present invention will be readily apparent by reference to the following detailed description.

DESCRIPTION OF THE PREFERRED EMBODIMENTS

The foregoing objects, and others are achieved by providing an aqueous, one phase ink composition having a viscosity, at 25°C., of between 2 and 10 centipoises (preferably from 2 to 5 centipoises) and suitable for use in porous point pens. The ink contains a release agent having a very low vapor pressure, water, a dye soluble in the water but insoluble in the release agent, and a silicone surfactant which is soluble in the ink composition.

In addition to the foregoing essential components the ink composition may contain other additives, particularly a water soluble wax and a water-miscible organic solvent.

As has been noted above, one of the critical aspects of the present invention is in the feature that the dye is insoluble in the release agent. The reason the inks of the present invention are easily erasable from the marking board of the invention is due to the release agent, the surface active agent, and a dye which must be insoluble in the release agent. The inks of the present invention are so effective because when the ink is deposited on the hard, impervious plastic surface the release agent comes out of solution from the aqueous solvent (water or a mixture of water and water soluble organic solvent) as it evaporates and forms a film on the marking surface. The dyes, which are insoluble in the release agent, lie on top of the thin film of release agent thereby forming a distinct trace of line on the marking board surface. The trace is easily erasable therefrom because the dye or dyes are not in contact with the surface of the board and because it is not necessary to erase or remove all of the release agent in order to remove the trace or line from the marking board.

From the foregoing description, it can be seen that the release agents must have a very low pressure so that they will not evaporate from the marking board, which would allow the dye to contact the marking board surface. Moreover, the water and/or other solvents utilized in the ink composition must have a relatively high evaporation rate so that the water and/or solvent will evaporate quickly and allow the release agent to come out of solution.

The surface active agents which are operable in the present invention are liquid organic silicone surface active agents. As is known in the art, organo-silicones have hydrophobic properties without the necessity for having long-chain hydrocarbon radicals. Thus, in order to make a surface active agent from any organo-silicone compound it is only necessary to attach thereto any of a number of well known water solubilizing agents (hydrophilic groups). In general, the preferred solubilizing groups of this invention are polyoxyalkylene polymers, the alkylene group having from two to four carbon atoms, and copolymers thereof with, e.g. polyalkylenes, the alkylene group having from two to four carbon atoms.

Normally, the solubilizing group or groups will be connected to the organic silicone compound or polymer by an ether or ester grouping linkage; however, we have found that the particular linkage is not important.

Examples of surface active agents useful in the present invention are liquid organo-silicones such as the reaction product of a lower alkyl ester of a hydrocarbon siliconic acid with a polyglycol (e.g. $C_{18}H_{37}Si[O(C_2H_4O)_nH]_3$) and polyoxyalkylene ether (the alkylene group having two to four carbon atoms) of poly (lower alkyl) siloxane; and complexes of higher alkylamines with silicone halide such as

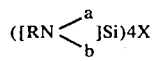

where R is hydrocarbon, each of $a$ and $b$ is lower alkyl or hydrogen, and X is halogen such as chlorine. At the present time, the invention contemplates using all types of silicone surface active agents, including nonionic and inoic types (e.g. cationic and anionic). The presently preferred silicone surface active agents are the nonionic type such as copolymers of siloxanes and polyoxyalkylenes; however, silicone surfactants which are ionic are also contemplated such as the quaternary amine type or the cationic type exemplified above.

We have also found that, in general, the most desirable liquid organic silicone surface active agents are not only nonionic but have a hydrophilic-lipophilic balance (hereinafter "HLB") rating of at least 10 and, preferably, at least 12. As is known in the art, HLB represents the emulsification properties of the surface active agent and indicates the extent to which it behaves as an oil-soluble type of emulsifier. For nonionic surface active agents the HLB rating can be calculated roughly by the following equation: $HLB = (A + P)/5$, where $A$ is the weight percent of the alkoxy units and $P$ is the weight percent of polyol units. Generally speaking, the HLB ratings or numbers run from about 1 to about 20, the lower numbers or rating representing surface active agents having lipophilic properties and the higher numbers indicating surface active agents having hydrophilic properties.

The reason that we prefer silicone surface active agents which have an HLB rating of at least 10 is because we have found that in many of the inks tested the ink is easier to erase from the plastic surface if the surface active agent has an HLB rating of at least 10. In order to prepare an organic-silicone surface active agent having an HLB rating of at least 10 it is only necessary to attach thereto any known water-solubilizing agent or agents in an amount sufficient to raise the HLB rating to at least 10. As has been noted above, it is generally preferred if the solubilizing groups are polyoxyalkylene polymers.

The amount of organo-silicone surface active agent present in the ink composition is not critical provided that, in the amounts used, the surface active agent is soluble. As has been noted before, it is important that the ink composition of this invention be a solution. The minimum amount of surfactant utilized is that amount which prevents retraction of the ink composition on the smooth, hard, relatively impervious plastic surface, and which will allow the ink to write over sebum. No adverse effects are found by utilizing an excess amount of surface active agent except that from an economic standpoint it makes the ink composition more expensive. Generally speaking, the amount of surface active agent added to the ink composition should be sufficient to reduce the surface tension of the ink composition to between 20 and 25 dynes/cm. to 35 or 40 dynes/cm. We have found that as little as 0.5%, by weight, based on the weight of the entire composition, of surface active agents will produce good results and the preferred amount of surface active agent added to the ink composition will range from about 0.5% to as high as say 3%, 4%, or 5%. Generally speaking the amount of surface active agent added will be between about 1% and 2%, by weight.

The release agents of the present invention are very critical in that the release agent enables the ink composition of the present invention to be easily erased from the marking board because the release agents form a film on the board and the dye or dyes, because they are insoluble in the release agent, lie on the film thereby making a legible mark on the board which is easily wiped off of the board with a dry eraser. The release agents of the present invention must have the following properties: (1) low vapor pressure, less tham 0.01mm. of mercury at 25°C. (2) completely soluble in the ink composition at the concentrations utilized, (3) the dyes utilized are substantially insoluble in the release agent, (4) low toxicity, (5) are liquid at room temperature and (6) substantially colorless in order to prevent masking of the color of the dyes and to prevent the marking board from being colored after erasing if the release agent still remains on the board.

The exemplary liquid release agents which are operable in the present invention include linear, low boiling (i.e. those having a vapor pressure of less than 0.01mm. of mercury) polyesters and polyethers which are preferably terminated with carboxylic acid groups or alcohol groups. Exemplary of such types of polymers are polyethers such as polypropylene glycol of varying molecular weights (e.g. 400, 700, 1,000 and higher) and linear polyesters resulting from the esterification of dibasic acid with glycols. Another group of release agents are esters of a carboxylic acid (mono, di or tri) with an alcohol, the esters having a molecular weight of above 100. Exemplary monobasic acids from which esters can be formed are aromatic acids such as benzoic acid and fatty acids such as oleic acid; bibasic acids such as phthalic acid, adipic acid, azelaic acid, succinic acid, maleic acid and sebacic acid; and tribasic acids such as trimellitic acid, tricarballylic acid, aconitic acid, and citric acid. Alcohols from which esters can be formed with any carboxylic acid include monohydric alcohols such as aromatic alcohols, (e.g. benzyl alcohol), cyclic alcohols (e.g. cyclohexyl alcohol) and aliphatic alcohols having 12 carbon atoms or less and preferably four carbon atoms or less (e.g. hexyl alcohol 2-ethyl hexyl alcohol, issooctyl alcohol, tridecyl alcohol, methyl alcohol, ethyl alcohol, propyl alcohol, and butyl alcohol); dihydric alcohols having 12 carbon atoms or less and preferably six carbon atoms or less such as etheylene glycol, propylene glycol, butylene glycol, neopentyl glycol and dipropylene glycol; and trihydric alcohols having 12 carbon atoms or less and preferably six carbon atoms or less such as glycerol.

When utilizing dihydric or trihydric alcohols we have found that it is generally preferable to form the corresponding ester by reacting the dihydric or trihydric alcohol with a mono-carboxylic acid. Conversely, when using a dicarboxylic or tricarboxylic acid to form the ester it is preferred if the dicarboxylic or tricarboxylic acid is reacted with a monohydric alcohol to form the corresponding ester.

The exemplary esters utilized in the present invention are acetyl triethyl citrate, diethyl maleate, dimethoxy ethyl phthalate, triacetin, dimethyl phthalate, glyceryl triacetate, dibutyl phthalate, butyl benzyl phthalate, diisoamyl phthalate, dioctyl adipate, diisoctyl azelate, diethyl phthalate, dioctyl sebacate, triisooctyl trimellitate, tetra-N-butyl thiodisuccinate, butyl stearate, triethyl tricarballylate and triethyl aconitate.

Other excellent compounds useful as release agents are liquid aliphatic dihydric alcohols having at least six carbon atoms such as octylene glycol.

As has been noted before, both the release agent and the dye must be selected so that the dye is insoluble in the liquid release agent. If the dye is soluble in the release agent then the resulting ink composition when written on the marking board will not erase easily.

The amount of release agent utilized is not particularly critical providing that in the amounts utilized the particular release agent is soluble in the aqueous solvent. Generally speaking, the amount of release agent can range from 0.1% to about 5%, by weight based on the weight of the entire composition, with the preferred range being from 1% to about 3% or 5%, by weight.

The solubility of a particular dye in a particular release agent is readily determined by adding 0.1 grams of dye to 5.0 grams of release agent. If the dye dissolves to any appreciable extent in the release agent, the release agent will be colored. If the release agent has no color whatsoever then the dye is considered to be insoluble in the release agent and the dye and release agent will be compatible and useful in the ink compositions of this invention. It should also be noted that if the release agent has a slight color to it after adding the dye thereto the combination of the dye and release agent will be operable in the present invention, but the ink composition produced therefrom will not be quite as erasable as the combination where the dye is completely insoluble in the release agent.

Insofar as dyes are concerned, any water soluble dye is useful in the present invention provided, of course, that it is insoluble in the release agent. The reason that it is desired to use water soluble dyes is so that the ink composition can easily be removed from clothes and the like. Acid dyes are preferred but basic dyes can be utilized. In order to exemplify operable combinations of release agents and dyes there is given in the following page in Table I solubilities of various dyes in various release agents.

Table I

Bleeding of Marking Board Dyes in Various Release Agents
0.1 Grams of Dye in 5.0 Grams of Release Agent

| Release Agent | Eosine FA | Pontacyl Carmine 2G | Brilliant Scarlet 3R | Acid Rhodamine B | Pontacyl Lt. Yellow GX | Orange G Crude | Pontacyl Green NV | Alphazurine FGND |
|---|---|---|---|---|---|---|---|---|
| Acetyl Triethyl Citrate | S | N | N | N | N | N | N | N |
| Tetra-N-Butyl Thiodisuccinate | S | N | N | N | N | S | N | N |
| Diethyl Maleate | S | N | S | N | N | N | S | N |
| Triacetin | M | N | N | S | S | M | N | N |
| Dimethyl Phthalate | S | N | S | H | N | S | H | N |
| Dimethoxy Ethyl Phthalate | H | N | N | M | S | M | M | N |
| Polypropyleneglycol (M.W. 1025) | H | S | N | M | S | H | M | S |
| Tri-2-Chloro Ethyl Phosphate | D | H | M | H | M | M | D | H |
| Polypropyleneglycol (M.W. 425) | D | H | M | H | H | H | H | H |
| Tris (Tetrahydrofurfural) Phosphate | D | H | M | H | H | H | D | D |

DESIGNATIONS
D  Dye completely dissolved
H  Intense color, dye not completely dissolved
M  Medium color
S  Slight color
N  No color The dyes listed in Table I have the following Color Index name and number:

| Dye | Color Index Name | Color Index Number |
|---|---|---|
| Eosine FA | Acid Red 87 | 45380 |
| Pontacyl Carmine 2G | Acid Red 1 | 18050 |
| Brilliant Scarlet 3R | Acid Red 18 | 16255 |
| Acid Rhodamine B | Acid Red 52 | 45100 |
| Pontacyl Lt. Yellow GX | Acid Yellow 17 | 1896 |
| Orange G Crude | Acid Orange 10 | 16230 |

| Dye | -continued<br>Color Index<br>Name | Color Index<br>Number |
|---|---|---|
| Pontacyl Green NV | Acid Green 16 | 44025 |
| Alphazurine FGND | Acid Blue 9 | 42090 |

If necessary, or desirable, an organic solvent can be utilized which is soluble in water. It is sometimes desirable to utilize an organic solvent in order to render the surfactant and/or release agent more soluble in the ink composition. Moreover, a great many organic solvents aid the ink composition in writing over sebum contaminated surfaces. Because one of the features of the present invention resides in depositing the film of release agent on the marking board, the organic solvent should have a high evaporation rate in order to allow the release agent to come out of solution as the organic solvent and water evaporates. We have found that organic solvents having an evaporation rate greater than 0.1, at room temperature, using butyl acetate as 1.0 as the basis, are satisfactory. In other words, the rate of evaporation of the organic, water-soluble, solvent of the present invention should be greater than one-tenth that of butyl acetate at room temperature. Organic solvents which are useful in the present invention are, generally speaking, alcohols or lower alkyl ethers or esters of alcohol, providing, of course, that they have the necessary rate of evaporation and are soluble in water. Suitable alcohols are the lower alkyl alcohols such as methanol, ethanol, isopropanol, propanol and butanol. Additionally, lower alkyl dihydric alcohols can also be utilized. Exemplary of lower alkyl ethers and esters of the above alcohols which can be utilized in the present invention are butyl acetate, glycol butyl ether, and glycol methyl ether. We have found that it is particularly desirable to use the lower alkyl alchols because these organic solvents aid in writing over sebum contaminated plastic surface.

The amount of water soluble organic solvent used in the ink compositions of the present invention is not particularly critical and, the amount utilized is based on the solubility of the release agents and/or surface active agents as well as the solubility of the dye in the particular water-organic solvent mixture. Generally speaking, the amount of organic solvent in the ink compositions of this present invention will be 50% or less, by weight, based on the weight of the organic solvent and water, and preferably will range from 0 to 30% since water per se can be utilized as the sole solvent.

As has been noted before, other additives can be utilized in the present invention. One of the preferred additives is a solid water-soluble wax which will prevent dusting. Basically, the water-soluble wax forms a matrix containing the dye on top of the film of release agent. When the trace is removed from the marking board the matrix of wax and dye are erased together thereby preventing the dye particles from forming a dust which will get on the hands, clothes and floor. From the foregoing it is seen that the dye should be soluble in the wax so that the dyes will form a continuous matrix with the wax. Additionally, the most effective waxes have HLB ratings in the 12 or 15 to 20 range.

Suitable waxes useful in the present invenion are aliphatic ethers (the aliphatic group containing from 12 to 24 carbon atoms) and aromatic ethers of polyoxyalkylene, the alkylene group having two to four carbon atoms, such as polyoxyethylene lauryl ether (the polyoxytehylene having 23 repeating units), polyoxyethylene cetyl ether (the polyoxyethylene having 20 repeating units), polyoxyethylene oleyl ether (Brij 98), and polyoxyethylene alkyl aryl ether (Renex 650). Other suitable waxes are higher aliphatic and aromatic esters of polyoxyalkylene, the alkylene group having 2 to 4 carbon atoms, such as polyoxyethylene stearate, the polyoxyethylene group having 40, 50 and 100 repeating units, and polyoxyethylene glyceride (G-1300). Other suitable compounds made of polyoxyalkylene polymers are polyoxyethylene hydrogenated tallow amide. Additional waxes useful in the present invention are esters of polyethylene glycol such as the distearate ester and monostearate ester.

The concentration of the wax in the ink compositions of this invention is not particularly critical except if an escessive amount is utilized the ink will have a tendency to smear on the marking board. At the present time, the amounts contemplated will range from 0.5 to about 5% with the preferred amount being from 1% to about 3%. If greater amounts than about 5% are utilized the ink trace on the marking board will smear.

The marking board itself can be made of a number of materials and the surface can be polypropylene, polyethylene, polyethylene terephthalate, polystyrene, cellulose acetate, and polyvinylchloride. It is preferred if the plastic does not have a surface glare and therefore acrylic plastics are not as desirable as, for example, polypropylene. However, acrylic plastics can have the surface glare reduced by coating with an anti-glare finish or, in the alternative, embossing the acrylic plastic. The preferred marking board surface is polypropylene because it is readily available and because it has very little surface gloss.

In order to determine whether a particular ink is erasable we have designed a standard test and machine. The machine is a mechanical erasing instrument which has an arm that moves back and forth over the marking board surface at a constant speed and pressure (22.5 g/cm$^2$). A facial tissue (Kleenex) is attached to the wiping surface of the erasing arm bearing the erasing operation. During erasing, the ink is removed in two stages. The first stage shears away the majority of the ink but leaves behind an image of the original marking. The first stage is referred to as ink removal, while the second stage is called image removal. The fewer number of cycles taken to remove the ink and the image the better the erasability of the ink. Generally speaking, if it takes more than 10 cycles to remove the ink and more than 20 cycles to remove the image, the ink is considered to be non-erasable. The marking surface utilized in all of the tests was a film of polypropylene.

In order to demonstrate a remarkable characteristic of the composition of the present invention an ink composition was made up which contained various release agents. The ink had the following composition, in parts by weight: ethanol, 20; silicone surface active agent 1; release agent, 1.5; preservative (methyl parasept), 0.2; water 71.3; Pontacyl Carmine 2G, 1.5; Erosine FA, 2.0; Brilliant Scarlet 3R, 2.5; and Orange G. Crude, 0.5. The silicone surface active agent is marketed under the trademark DC-193 and is polyoxyethylene, polyoxypropylene, polymethyl siloxane. The effect of the various release agents in the foregoing composition (a red ink) is shown in Table II.

Table II

| Release Agent | Ink Removal, Cycles | Image Removal, Cycles |
| --- | --- | --- |
| Acetyl Triethyl Citrate | 1.8 | 7.8 |
| Diethyl Maleate | 2.0 | 8.0 |
| Tetra-N-Butyl Thiodisuccinate | 2.2 | 7.6 |
| Dimethoxy Ethyl Phthalate | 2.6 | 7.8 |
| Triacetin | 2.6 | 10.4 |
| Dimethyl Phthalate | 2.2 | 18.0 |
| Polypropylene Glycol (M.W. 425) | 4.0 | 19.2 |
| Polypropylene Glycol (M.W. 1000) | 7.4 | 17.4 |
| Tri-2-Chloro Ethyl Phosphate | 3.0 | 21.0 |
| Tris (Tetrahydrofurfural) Phosphate | 3.4 | 24.0 |

In order to demonstrate how the waxes of the present invention prevent dusting the following blue and red ink compositions were formulated:

| Type | Component | Blue Ink Parts by Weight | Red Ink Parts by Weight |
| --- | --- | --- | --- |
| Solvent | Isopropanol | 25 | 25 |
| Solvent | Water | 63.5 | 65.6 |
| Wax | Polyoxyethylene hydrogenated tallow amide | 2 | 2 |
| Surfactant | DC-193 | 1 | 1 |
| Release Agent | Polypropylene glycol (M.W.=1025) | 1 | 1 |
| Preservative | Methyl Parasept | 0.2 | 0.2 |
| Dyes | Alphazurine FGND | 5 | — |
|  | Acid Rhodamine B | 1 | — |
|  | Pontacyl Carmine 2G | — | 1.5 |
|  | Eosine FA | — | 2.5 |
|  | Brilliant Scarlet 3R | — | 2.5 |
|  | Orange G Crude | — | 0.75 |

The foregoing compositions were easily erased from a marking board having a surface of polypropylene, the tracings placed on the marking board being done with a porous point pen (a Flair pen). These inks erased as easily as those exemplified in Table II, however, when the foregoing ink compositions were erased with a dry eraser they created only half as much dusting.

Other exemplary embodiments of various kinds containing a variety of release agents, waxes, solvents systems and surfactants are given below, in which all percentages are by weight unless expressly stated otherwise.

The following green ink composition was easily erased from a polypropylene board (1.0 cycles) and the image was removed in 3.4 cycles:

Green Ink

| Components | Parts by Weight |
| --- | --- |
| Ethanol | 20.0 |
| DC-470-A(polyoxyethylene, polymethyl siloxane) | 1.0 |
| Methyl parasept | 0.2 |
| Acetyl triethyl citrate (release agent) | 1.0 |
| Brij 35 (polyoxyethylene (23) lauryl-ether) | 0.5 |
| Sodium hydroxide (50%) | 0.2 |
| Pontacyl Light Yellow GX Crude | 1.5 |
| Pontacyl Green NV Crude | 4.5 |
| Water | 70.3 |

The following ink composition is a black ink which, when utilized in a porous point pen on polypropylene, had an ink removal of two cycles and an image removal of six cycles. Additionally, no dusting was found. The ink composition is given below:

Black Ink

| Components | Percentage by Weight |
| --- | --- |
| Ethanol | 20.0 |
| DC-470-A (polyoxyethylene polymethyl siloxane) | 1.0 |
| Methyl Parasept | 0.2 |
| Acetyl Tri-ethyl Citrate | 1.5 |
| Brij 35 (polyoxyethylene (23) lauryl ether) | 1.5 |
| Acid Rhodamine B | 1.8 |
| Orange G. Crude | 2.4 |
| Alphazurine FGND | 3.7 |
| Pontacyl Carmine 2G Crude | 1.3 |
| Pontacyl Light Yellow GX Crude | 2.1 |
| Water | 64.5 |

In the following blue ink composition the ink was placed in a porous point pen and tracings were formed on a polypropylene board. The ink was then tested to determine the ink removal and image removal and it was found that the ink removal required 2.2 cycles and image removal required 6.4 cycles. The ink composition had the following components:

Blue Ink

| Components | Parts by Weight |
| --- | --- |
| SDA-39C Ethanol | 20.0 |
| DC-470-A (polyoxyethylene polymethyl siloxane) | 1.0 |
| Methyl Parasept | 0.2 |
| Acetyl Tri-ethyl Citrate | 1.0 |
| Brij 35 (polyoxyethylene (23) lauryl ether) | 0.5 |
| Dextrin | 1.5 |
| Sodium Hydroxide (50%) | 0.2 |
| Acid Rhodamine B | 1.0 |
| Alphazurine FGND | 5.0 |
| Water | 68.8 |

Dextrin is utilized in the ink compositions of this invention because we have found that, in some instances, the tracings on the plastic surface are brighter and more distinct.

In order to demonstrate the excellent erasability characteristics of a black ink made with a low molecular weight polypropylene glycol as the release agent the following ink was formulated:

Black Ink

| Components | Parts by Weight |
| --- | --- |
| Ethanol | 20.0 |
| DC-193 (polyoxyethylene, polyoxypropylene polymethyl siloxane | 1.0 |
| Polypropylene Glycol (M.W.=425) | 2.0 |
| Methyl Parasept | 0.2 |
| Sodium Chloride | 1.3 |
| Rhodamine B Acid | 1.8 |
| Orange G. Crude | 2.4 |
| Alphazurine FGND | 3.7 |
| Pontacyl Carmine 2G | 1.3 |
| Pontacyl Light Yellow GX Crude | 2.0 |
| Water | 64.2 |

The above black ink was found to be easily erased but dusting was somewhat of a problem inasmuch as the ink did not contain any water soluble wax.

We have also made a number of other inks in which the following waxes were found to be very desirable in eliminating dusting. These waxes are listed in Table III given below.

TABLE III

Effective Waxes for Marking Board Inks

| Commercial Name | Chemical Composition | Manufacturer |
| --- | --- | --- |
| Brij 58 | Polyoxyethylene (20) Cetyl Ether | Atlas Chemical Ind. |
| Brij 98 | Polyoxyethylene (20) Oleyl Ether | Atlas Chemical Ind. |
| Renex 650 | Polyoxyethylene Alkyl Aryl Ether | Atlas Chemical Ind. |
| Myrj 52S | Polyoxyethylene (40) Stearate | Atlas Chemical Ind. |
| Myrj 53 | Polyoxyethylene (50) Stearate | Atlas Chemical Ind. |
| Myrj 59 | Polyoxyethylene (100) Stearate | Atlas Chemical Ind. |
| G-1295 | Polyoxyethylene Fatty Glyceride | Atlas Chemical Ind. |
| G-1300 | Polyoxyethylene Glyceride Ester | Atlas Chemical Ind. |
| Ethomid HT/60 | Polyoxyethylene (5) Hydrogenated Tallow Amide | Armour Industrial Chemical Company |

From the foregoing exemplary embodiment it can easily be seen that the ink compositions of the present invention require an aqueous solvent (the aqueous solvent containing from 0 to 100 percent water and from 0 to 50% water soluble organic solvent), a release agent, a silicone surface active agent, and a water soluble dye or dyes which are insoluble in the release agent. The amount of aqueous solvent in the ink composition is not particularly critical and can range from as high as 90 to 95% by weight to as low as 50% by weight with the preferred range being from 70 or 75% to 90% by weight.

In addition to the above critical constituents of the ink compositions of the present invention it is desirable to have a water soluble wax in order to prevent dusting. Additionally, with certain dyes, it is desirable to have a film forming constituent such as dextrin added to the composition.

It will be understood that the foregoing description is only illustrative of the present invention and it is not intended that the invention be limited thereto. Many other specific embodiments of the present invention will be apparent to one skilled in the art from the foregoing disclosure. All substitutions, alterations and modifications of the present invention which come within the scope of the following claims or to which the present invention is readily susceptible without departing from the spirit and the scope of this disclosure are considered a part of the present invention.

We claim:

1. A marking board having a smooth, virtually non-porous plastic surface upon which are legible tracings which can easily be erased, said tracings consisting essentially of a film of a liquid release agent and a liquid silicone surface active agent which has an HLB of at least 10, one surface of which is in contact with said plastic surface and the other surface of said film having a layer of water-soluble dye particles not in contact with said plastic surface, said release agent being substantially colorless and having low toxicity and a vapor pressure of less than 0.01mm. of mercury at 25°C. and being selected from the group consisting of a polyester, a polyether, an ester of carboxylic acid having a molecular weight greater than 100, and an aliphatic glycol havingg at least six carbon atoms, said water-soluble dye being insoluble in said release agent.

2. A marking board according to claim 1 wherein the water-soluble dye is in a matrix of a water-soluble wax.

3. A marking board according to claim 1 in which said plastic is selected from the group consisting of polypropylene, polyethylene, polyethylene terephthalate, polystyrene, cellulose acetate, and polyvinyl chloride.

* * * * *